US012811251B2

(12) United States Patent
Kawaguchi

(10) Patent No.: US 12,811,251 B2
(45) Date of Patent: Nov. 24, 2026

(54) SECONDARY BATTERY

(71) Applicant: Prime Planet Energy & Solutions, Inc., Tokyo (JP)

(72) Inventor: Sayaka Kawaguchi, Akashi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 488 days.

(21) Appl. No.: 18/492,784

(22) Filed: Oct. 24, 2023

(65) Prior Publication Data

US 2024/0186656 A1 Jun. 6, 2024

(30) Foreign Application Priority Data

Dec. 5, 2022 (JP) ................................ 2022-194395

(51) Int. Cl.

*H01M 10/0587* (2010.01)
*H01M 50/103* (2021.01)
*H01M 50/417* (2021.01)
*H01M 50/431* (2021.01)
*H01M 50/451* (2021.01)
*H01M 50/46* (2021.01)
*H01M 50/531* (2021.01)

(52) U.S. Cl.

CPC ..... *H01M 50/461* (2021.01); *H01M 10/0587* (2013.01); *H01M 50/103* (2021.01); *H01M 50/417* (2021.01); *H01M 50/431* (2021.01); *H01M 50/451* (2021.01); *H01M 50/531* (2021.01)

(58) Field of Classification Search

CPC ............ H01M 50/461; H01M 50/417; H01M 50/103; H01M 50/531; H01M 10/0587; H01M 10/0525; H01M 10/0431; H01M 10/045

See application file for complete search history.

(56) References Cited

U.S. PATENT DOCUMENTS

2009/0239133 A1 9/2009 Kosugi
2013/0244072 A1 9/2013 Miyazaki et al.
2018/0097206 A1 4/2018 Arai et al.
2022/0140453 A1 5/2022 Yamada et al.

(Continued)

FOREIGN PATENT DOCUMENTS

EP 0973223 A1 1/2000
EP 4047705 A1 8/2022

(Continued)

*Primary Examiner* — Lessanework Seifu
(74) *Attorney, Agent, or Firm* — HAUPTMAN HAM, LLP

(57) ABSTRACT

A secondary battery disclosed herein includes a wound electrode body with a flat shape in which a first separator, a negative electrode, a second separator, and a positive electrode are wound. The positive electrode includes first adhesive layers on a first surface and a second surface. By the first adhesive layers, the first surface of the positive electrode and the first separator are attached to each other and the second surface of the positive electrode and the second separator are attached to each other. At least one of the first separator and the second separator includes a second adhesive layer in a winding start end region that exists on a winding start end side relative to a winding start end of the positive electrode. The first separator and the second separator are attached to each other by the second adhesive layer.

11 Claims, 6 Drawing Sheets

(56) References Cited

U.S. PATENT DOCUMENTS

| | | | | |
|---|---|---|---|---|
| 2022/0271348 | A1* | 8/2022 | Kawamura | H01M 50/451 |
| 2023/0207859 | A1* | 6/2023 | Wakimoto | H01M 10/0431<br>429/163 |

FOREIGN PATENT DOCUMENTS

| | | | |
|---|---|---|---|
| JP | 2000-173642 | A | 6/2000 |
| JP | 2003-086233 | A | 3/2003 |
| JP | 2007-258071 | A | 10/2007 |
| JP | 2008-226625 | A | 9/2008 |
| JP | 2012-009249 | A | 1/2012 |
| JP | 2015-146273 | A | 8/2015 |
| JP | 2016-131148 | A | 7/2016 |
| JP | 2019-186157 | A | 10/2019 |
| JP | 2022-074818 | A | 5/2022 |
| WO | 99/040645 | A1 | 8/1999 |
| WO | 2022/186173 | A1 | 9/2022 |

* cited by examiner

SECONDARY BATTERY

CROSS REFERENCE TO RELATED APPLICATION

This application claims the benefit of priority to Japanese Patent Application No. 2022-194395 filed on Dec. 5, 2022. The entire contents of this application are hereby incorporated herein by reference.

BACKGROUND OF THE DISCLOSURE

1. Field

The present disclosure relates to a secondary battery.

2. Background

One of the conventionally known secondary batteries includes a wound electrode body in which a first separator with a band shape, a negative electrode with a band shape, a second separator with a band shape, and a positive electrode with a band shape are stacked and wound around a winding axis, and a battery case that accommodates the wound electrode body. For example, Japanese Patent Application Publication No. 2022-74818 discloses a wound electrode body with a flat shape including a flat part with a pair of flat outer surfaces, and a pair of curved parts (R parts) provided at both ends of the flat part and each having a curved outer surface.

SUMMARY

The wound electrode body with a flat shape can be formed by, for example, press-molding an electrode body with a cylindrical shape. In this case, in the wound electrode body after the press-molding, in a lapse of time to insertion into a battery case, there arise forces that urge restoring of the cylindrical shape (so-called "springback"). This sometimes resulted in the increase in thickness of the wound electrode body and the decrease in insertability into the battery case. Moreover, the interelectrode distance between the positive and negative electrodes became large locally in the flat part of the wound electrode body, in which case the resistance increase, precipitation of charge carriers (for example, Li), or the like was likely to occur.

As a result of examinations of the present inventor, it has been revealed that when the electrode body is press-molded, the pressure at the pressing is not transmitted sufficiently to the flat part, so that space largely opens due to springback near the winding axis (center part of wound electrode body) where the first separator and the second separator face each other directly. Along with this, it has also been revealed that the first separator and/or the second separator is warped, so that the local interelectrode distance at the flat part increases and accordingly, the interelectrode distance varies. Hereinafter, the phenomenon that the large space opens at the center part of the wound electrode body and the phenomenon that the interelectrode distance locally increases in the flat part are called "middle crack" altogether.

The present disclosure has been made in view of the above circumstances, and a main object thereof is to provide a secondary battery including a wound electrode body with a flat shape in which the occurrence of a middle crack is suppressed.

A secondary battery according to the present disclosure includes: a wound electrode body with a flat shape in which a first separator with a band shape, a negative electrode with a band shape, a second separator with a band shape, and a positive electrode with a band shape are stacked and wound around a winding axis; and a battery case that accommodates the wound electrode body. The positive electrode includes first adhesive layers on a first surface and a second surface. By the first adhesive layers, the first surface and the first separator are attached to each other and the second surface and the second separator are attached to each other. At least one of the first separator and the second separator includes a second adhesive layer in a winding start end region that exists on a winding start end side relative to a winding start end of the positive electrode, and the first separator and the second separator are attached to each other by the second adhesive layer.

The first separator and the second separator are attached to each other by the second adhesive layer in the winding start end region; thus, the formation of a large space at a center part of the wound electrode body can be suppressed. Additionally, the positive electrode is attached to the first separator and the second separator by the first adhesive layers; thus, the local increase in interelectrode distance at the flat part can be suppressed. Therefore, according to the art disclosed herein, the occurrence of the middle crack can be suppressed and the increase in thickness of the wound electrode body after press-molding can be suppressed. Furthermore, the decrease in insertability into the battery case, the increase in resistance, precipitation of charge carriers (for example, Li), and the like can be suppressed.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, some preferred embodiments of the art disclosed herein will be described with reference to the drawings. Incidentally, matters other than matters particularly mentioned in the present specification, and necessary for the implementation of the art disclosed herein (for example, the general configuration and manufacturing process of a secondary battery that do not characterize the art disclosed herein) can be grasped as design matters of those skilled in the art based on the conventional art in the relevant field. The art disclosed herein can be implemented on the basis of the disclosure of the present specification and common technical knowledge in the relevant field. In the present specification, the notation "A to B" for a range signifies "a value more than or equal to A and less than or equal to B", and is meant to encompass also the meaning of being "more than A" and "less than B".

In the present specification, "secondary battery" refers to a general power storage device capable of being repeatedly charged and discharged by transfer of charge carriers between a positive electrode and a negative electrode through an electrolyte. The electrolyte may be any one of a liquid electrolyte (electrolyte solution), a gel electrolyte, and a solid electrolyte. The secondary battery includes so-called power storage batteries (chemical batteries) such as lithium ion secondary batteries and nickel-hydrogen batteries, and moreover includes capacitors (physical batteries) such as lithium ion capacitors and electrical double-layer capacitors, for example.

Figure 1:
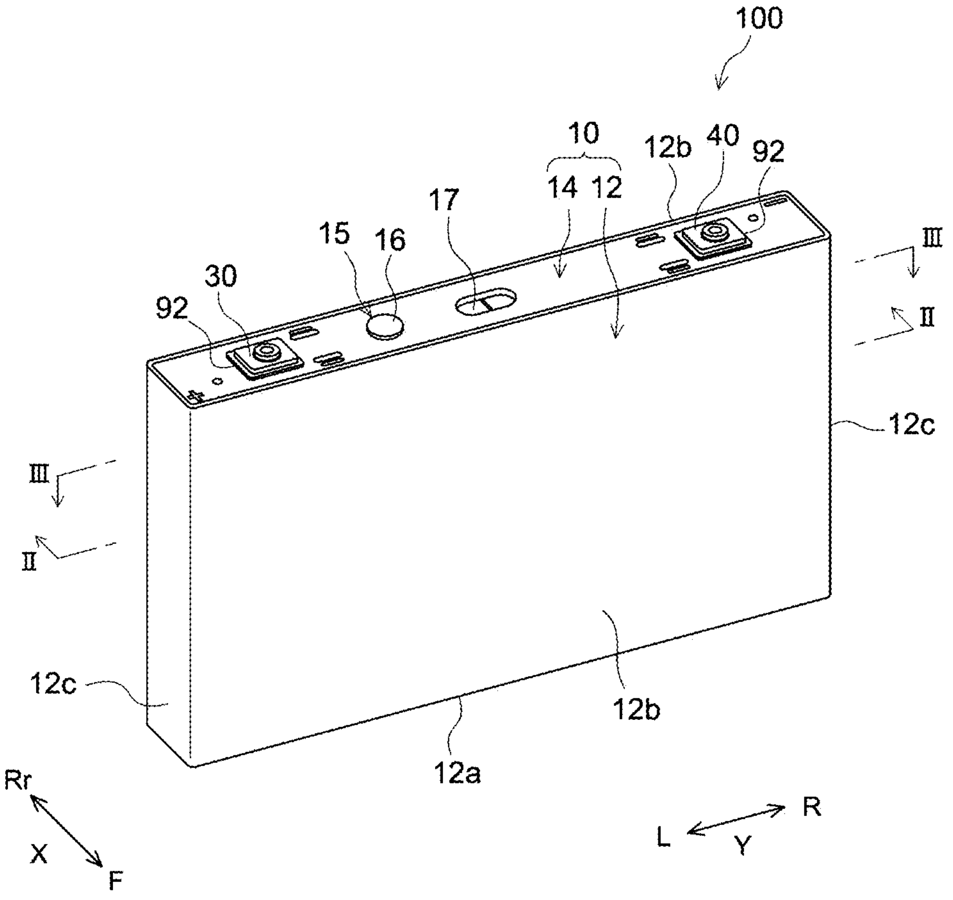
FIG. 1 is a perspective view schematically illustrating a secondary battery.
Figure 2:
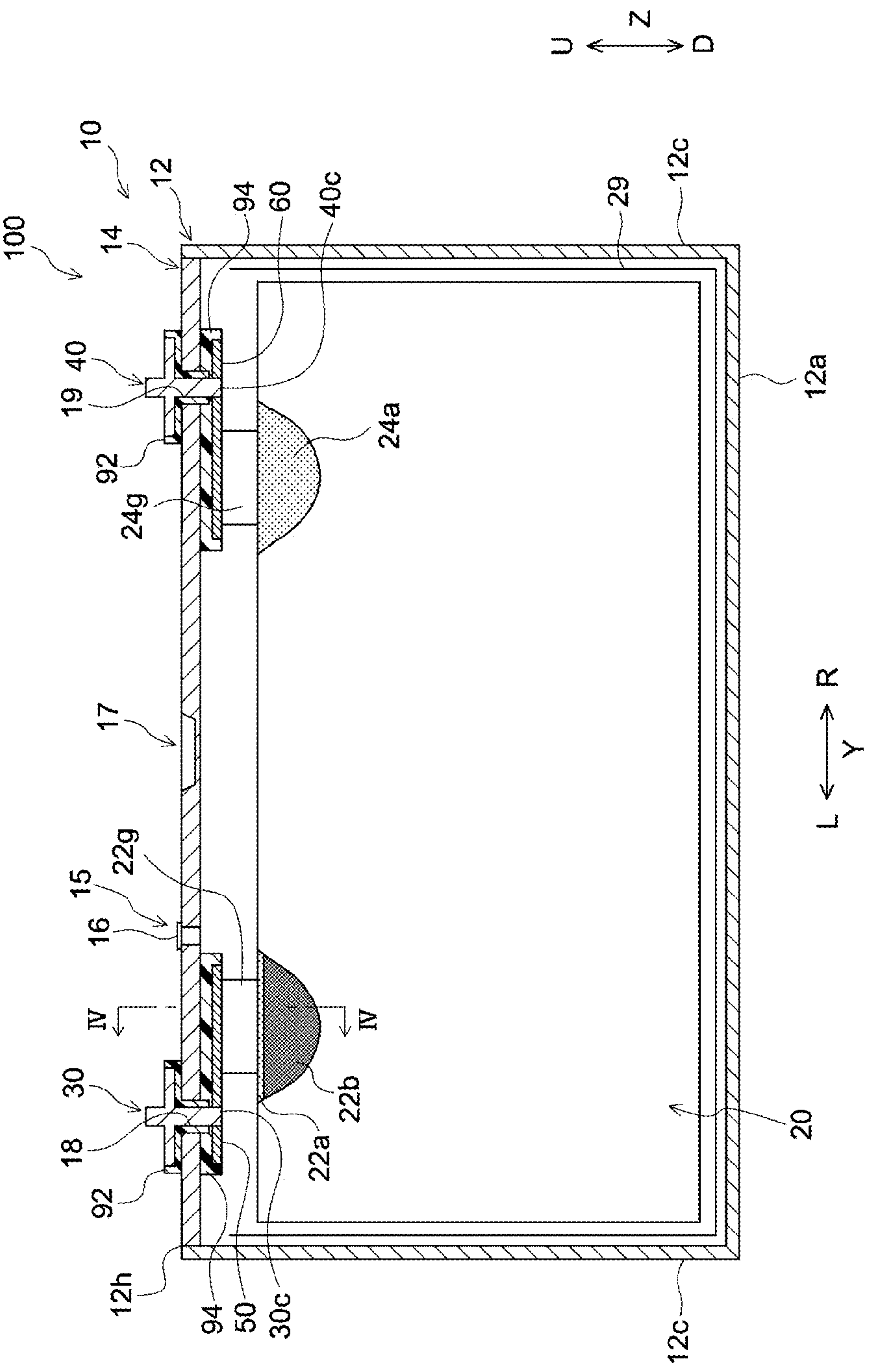
FIG. 2 is a schematic longitudinal cross-sectional view taken along line II-II in FIG. 1.
Figure 3:
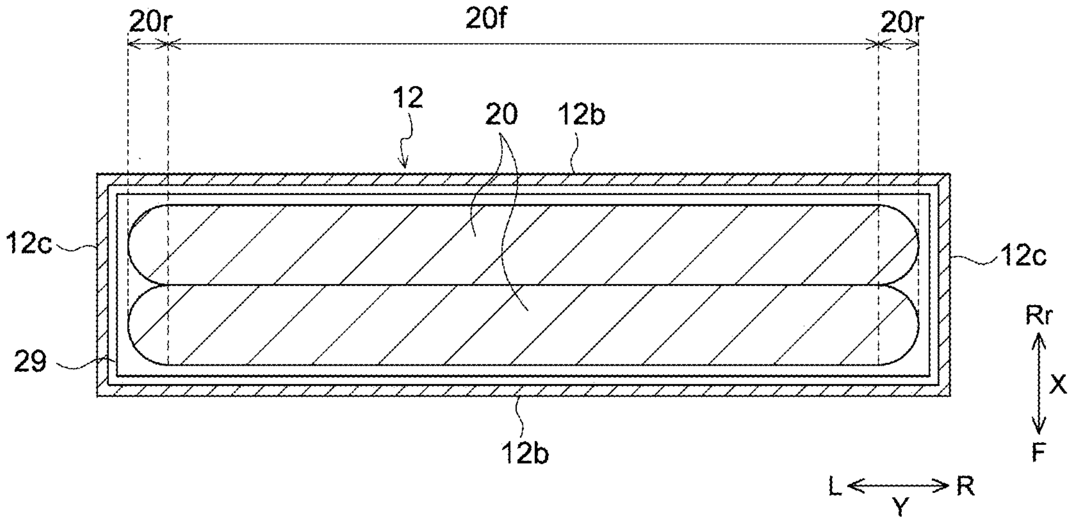
FIG. 3 is a schematic lateral cross-sectional view taken along line III-III in FIG. 1.
Figure 4:
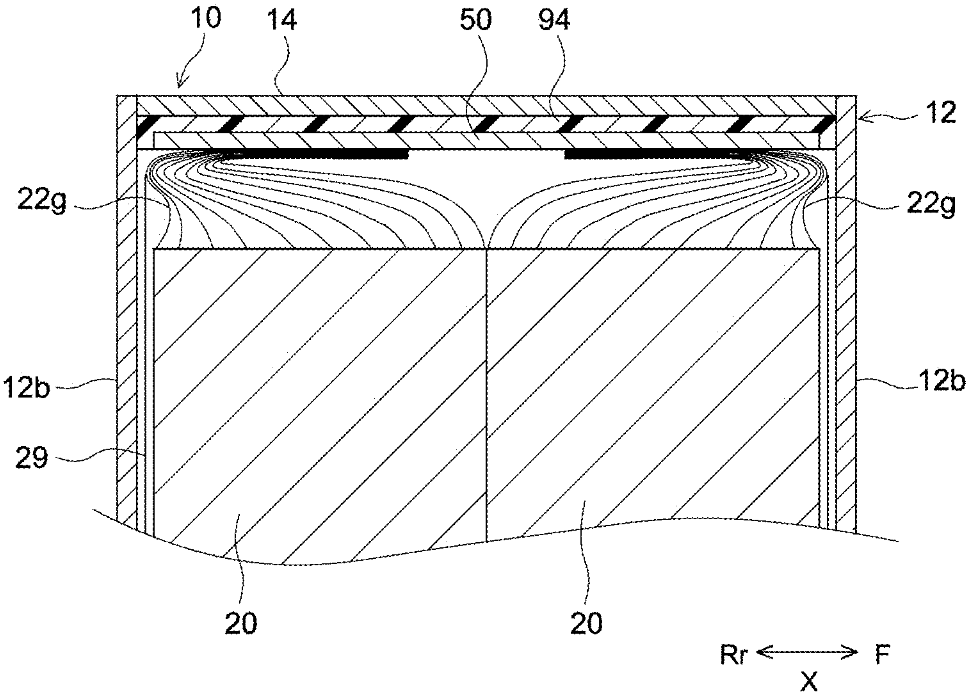
FIG. 4 is a schematic longitudinal cross-sectional view taken along line IV-IV in FIG. 2.

FIG. 1 is a perspective view schematically illustrating a secondary battery 100. FIG. 2 is a schematic longitudinal cross-sectional view taken along line II-II in FIG. 1. FIG. 3 is a schematic lateral cross-sectional view taken along line III-III in FIG. 1. FIG. 4 is a schematic longitudinal cross-sectional view taken along line IV-IV in FIG. 2. In the following description, reference signs L, R, F, Rr, U, and D in the drawings respectively denote left, right, front, rear, up, and down. In addition, a reference sign X in the drawings denotes a short side direction (thickness direction) of the secondary battery 100, a reference sign Y denotes a long side direction of the secondary battery 100 that is orthogonal to the short side direction, and a reference sign Z denotes an up-down direction of the secondary battery 100. These directions are defined however for convenience of explanation, and do not limit the manner in which the secondary battery 100 is disposed.

As illustrated in FIG. 2, the secondary battery 100 includes a battery case 10, a plurality of wound electrode bodies 20 (also see FIG. 3 and FIG. 4), a positive electrode terminal 30, a negative electrode terminal 40, a positive electrode current collecting member 50, and a negative electrode current collecting member 60. Although illustration is omitted, the secondary battery 100 further includes an electrolyte solution here. The secondary battery 100 here is a nonaqueous electrolyte secondary battery. The secondary battery 100 is preferably a lithium ion secondary battery.

The electrolyte solution may be any electrolyte solution used in general secondary batteries (for example, lithium ion secondary batteries), without particular limitations. One example thereof is a nonaqueous electrolyte solution in which a supporting salt is dissolved in a nonaqueous solvent. Examples of the nonaqueous solvent include carbonate solvents such as ethylene carbonate, dimethyl carbonate, and ethyl methyl carbonate. One example of the supporting salt is fluorine-containing lithium salt such as $LiPF_6$. The electrolyte solution may contain an additive as necessary. However, the electrolyte solution may have a solid form (a solid electrolyte) to be integrated with the wound electrode body 20.

The battery case 10 is a housing that accommodates the wound electrode bodies 20 and the electrolyte solution. As illustrated in FIG. 1, the external shape of the battery case 10 here is a flat and bottomed cuboid shape (rectangular shape). The secondary battery 100 is preferably a rectangular battery including the battery case 10 with a rectangular shape. A conventionally used material can be used for the battery case 10, without particular limitations. The battery case 10 is preferably made of a metal, and for example, more preferably made of aluminum, an aluminum alloy, iron, an iron alloy, or the like. The battery case 10 may be a laminate film with a bag-like shape.

As illustrated in FIG. 2, the battery case 10 includes an exterior body 12 having an opening 12*h*, and a sealing plate (lid body) 14 that seals the opening 12*h*. The battery case 10 preferably includes the exterior body 12 and the sealing plate 14. Each of the exterior body 12 and the sealing plate 14 has the size in accordance with the size of the wound electrode bodies 20 and the number of wound electrode bodies 20 to be accommodated (one or more, here more than one), for example.

The exterior body 12 is a bottomed and rectangular container with the opening 12*h* on an upper surface thereof. As illustrated in FIG. 1, the exterior body 12 includes a bottom wall 12*a* with a substantially rectangular shape, a pair of long side walls 12*b* extending from long sides of the bottom wall 12*a* and facing each other, and a pair of short side walls 12*c* extending from short sides of the bottom wall 12*a* and facing each other. The bottom wall 12*a* faces the opening 12*h* (see FIG. 2). The long side wall 12*b* is larger in area than the short side wall 12*c*. The long side wall 12*b* is one example of "first side wall", and the short side wall 12*c* is one example of "second side wall".

The sealing plate 14 is a plate-shaped member that is attached to the exterior body 12 so as to cover the opening 12*h* of the exterior body 12. The sealing plate 14 faces the bottom wall 12*a* of the exterior body 12. The sealing plate 14 is substantially rectangular in shape. The battery case 10 is unified in a manner that the sealing plate 14 is joined (for example, joined by welding) to a periphery of the opening 12*h* of the exterior body 12. In this way, the battery case 10 is hermetically sealed (closed).

As illustrated in FIG. 2, a liquid injection hole 15, a gas discharge valve 17, and terminal extraction holes 18 and 19 are provided in the sealing plate 14. The liquid injection hole 15 is a penetration hole for injecting the electrolyte solution inside the battery case 10 after the sealing plate 14 is assembled to the exterior body 12. The liquid injection hole 15 is sealed by a sealing member 16 after the injection of the electrolyte solution. The gas discharge valve 17 is a thin part that is configured to break when the pressure in the battery case 10 becomes more than or equal to a predetermined value so as to discharge the gas out of the battery case 10. The terminal extraction holes 18 and 19 are formed on both end parts of the sealing plate 14 in the long side direction Y. The terminal extraction holes 18 and 19 are penetration holes that penetrate the sealing plate 14 in the up-down direction Z.

The positive electrode terminal 30 is attached to one end part of the sealing plate 14 in the long side direction Y (left end part in FIG. 1 and FIG. 2). The negative electrode terminal 40 is attached to the other end part of the sealing plate 14 in the long side direction Y (right end part in FIG. 1 and FIG. 2). The positive electrode terminal 30 and the negative electrode terminal 40 are preferably attached to the sealing plate 14. The positive electrode terminal 30 and the negative electrode terminal 40 are inserted into the terminal extraction holes 18 and 19 and are partially exposed to a surface of the sealing plate 14. The positive electrode terminal 30 and the negative electrode terminal 40 are connected to other secondary battery or external device through an external connection member such as a busbar.

As illustrated in FIG. 2, the positive electrode terminal 30 is electrically connected to a positive electrode 22 (see FIG. 5) of the wound electrode body 20 through the positive electrode current collecting member 50 and a positive electrode tab group 22g to be described below (that is, a plurality of positive electrode tabs 22t that are stacked) inside the battery case 10. The positive electrode terminal 30 is preferably formed of a metal and is more preferably formed of, for example, aluminum or an aluminum alloy. The negative electrode terminal 40 is electrically connected to a negative electrode 24 (see FIG. 5) of the wound electrode body 20 through the negative electrode current collecting member 60 and a negative electrode tab group 24g to be described below (that is, a plurality of negative electrode tabs 24t that are stacked) inside the battery case 10. The negative electrode terminal 40 is preferably formed of a metal and is more preferably formed of, for example, copper or a copper alloy. The positive electrode terminal 30 and the negative electrode terminal 40 are insulated from the sealing plate 14 by a gasket 92. The gasket 92 is preferably made of resin.

The positive electrode current collecting member 50 is a conductive member and is attached to the sealing plate 14 in this case. As illustrated in FIG. 2, the positive electrode current collecting member 50 is insulated from an internal surface of the sealing plate 14 by an internal insulating member 94 made of resin. The positive electrode current collecting member 50 electrically connects between the positive electrode terminal 30 and the positive electrode tab group 22g of the wound electrode body 20. The positive electrode current collecting member 50 includes a first region with a plate shape extending in the long side direction Y along the internal surface of the sealing plate 14. One end part (right side in FIG. 2) of the positive electrode current collecting member 50 (in detail, the first region) in the long side direction Y is electrically connected to the positive electrode tab group 22g. The other end part (left side in FIG. 2) of the positive electrode current collecting member 50 (in detail, the first region) in the long side direction Y is electrically connected to a lower end part 30c of the positive electrode terminal 30. The positive electrode current collecting member 50 is preferably formed of a metal with excellent conductivity, such as aluminum or an aluminum alloy. The positive electrode current collecting member 50 may be formed of the same kind of metal as the positive electrode tab 22t and/or the positive electrode terminal 30.

The negative electrode current collecting member 60 is a conductive member and is attached to the sealing plate 14 in this case. The negative electrode current collecting member 60 is insulated from the internal surface of the sealing plate 14 by the internal insulating member 94 made of resin. The negative electrode current collecting member 60 electrically connects between the negative electrode terminal 40 and the negative electrode tab group 24g of the wound electrode body 20. As illustrated in FIG. 2, the negative electrode current collecting member 60 includes a first region with a plate shape extending in the long side direction Y along the internal surface of the sealing plate 14. One end part (left side in FIG. 2) of the negative electrode current collecting member 60 (in detail, the first region) in the long side direction Y is electrically connected to the negative electrode tab group 24g. The other end part (right side in FIG. 2) of the negative electrode current collecting member 60 (in detail, the first region) in the long side direction Y is electrically connected to a lower end part 40c of the negative electrode terminal 40. The negative electrode current collecting member 60 is preferably formed of a metal with excellent conductivity, such as copper or a copper alloy. The negative electrode current collecting member 60 may be formed of the same kind of metal as the negative electrode tab 24t and/or the negative electrode terminal 40.

As illustrated in FIG. 3 and FIG. 4, the secondary battery 100 according to the present embodiment includes a plurality of (specifically, two) wound electrode bodies 20 within the battery case 10. The number of wound electrode bodies 20 to be disposed in one battery case 10 is, however, not limited in particular and may be one, or three or more. The wound electrode bodies 20 here are disposed inside the battery case 10 in a state of being covered with an electrode body holder 29 made of a resin sheet. Thus, the direct contact between the wound electrode body 20 and the exterior body 12 is prevented.

Figure 5:
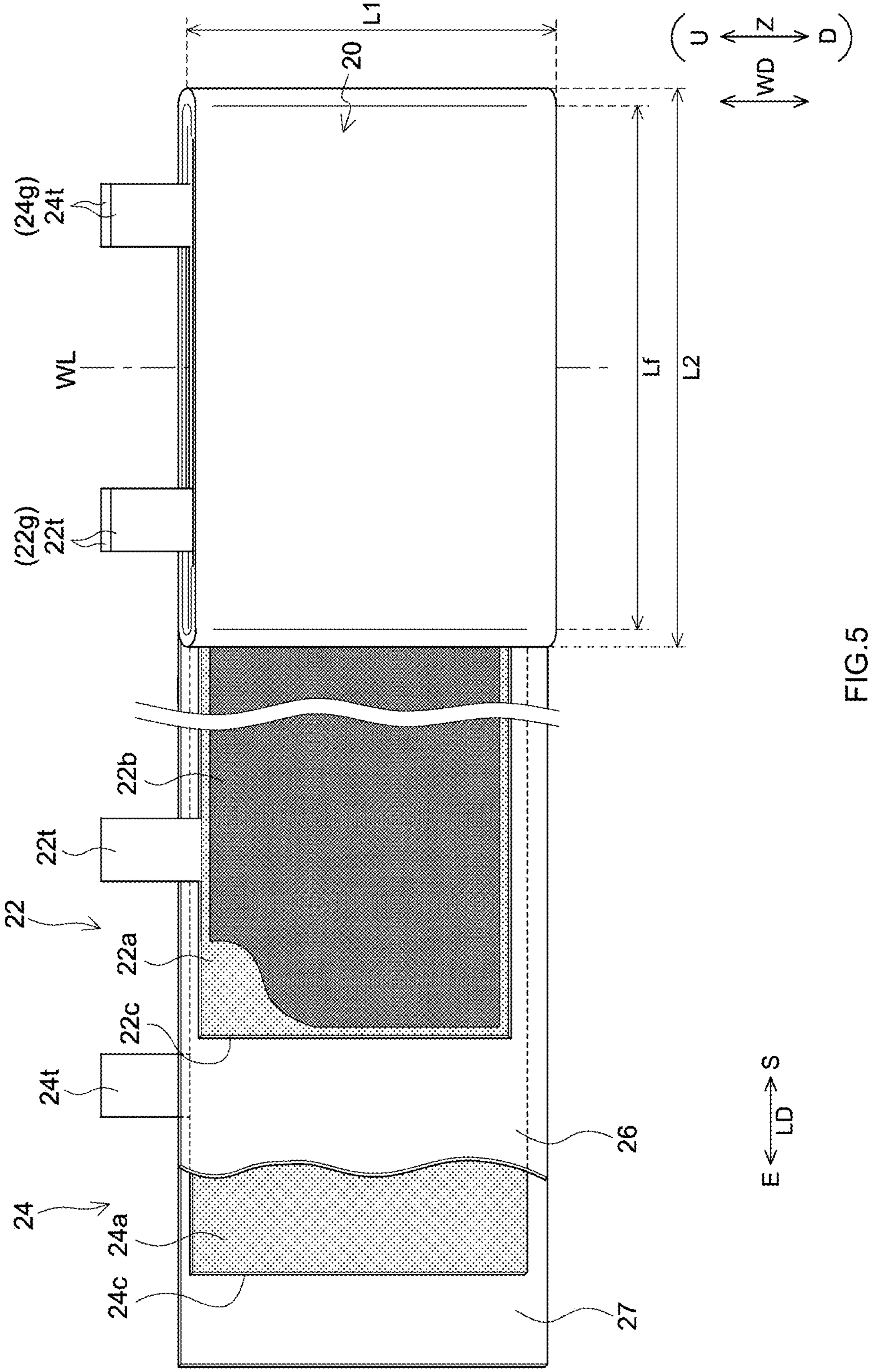
FIG. 5 is a perspective view schematically illustrating a structure of a wound electrode body.
Figure 6:
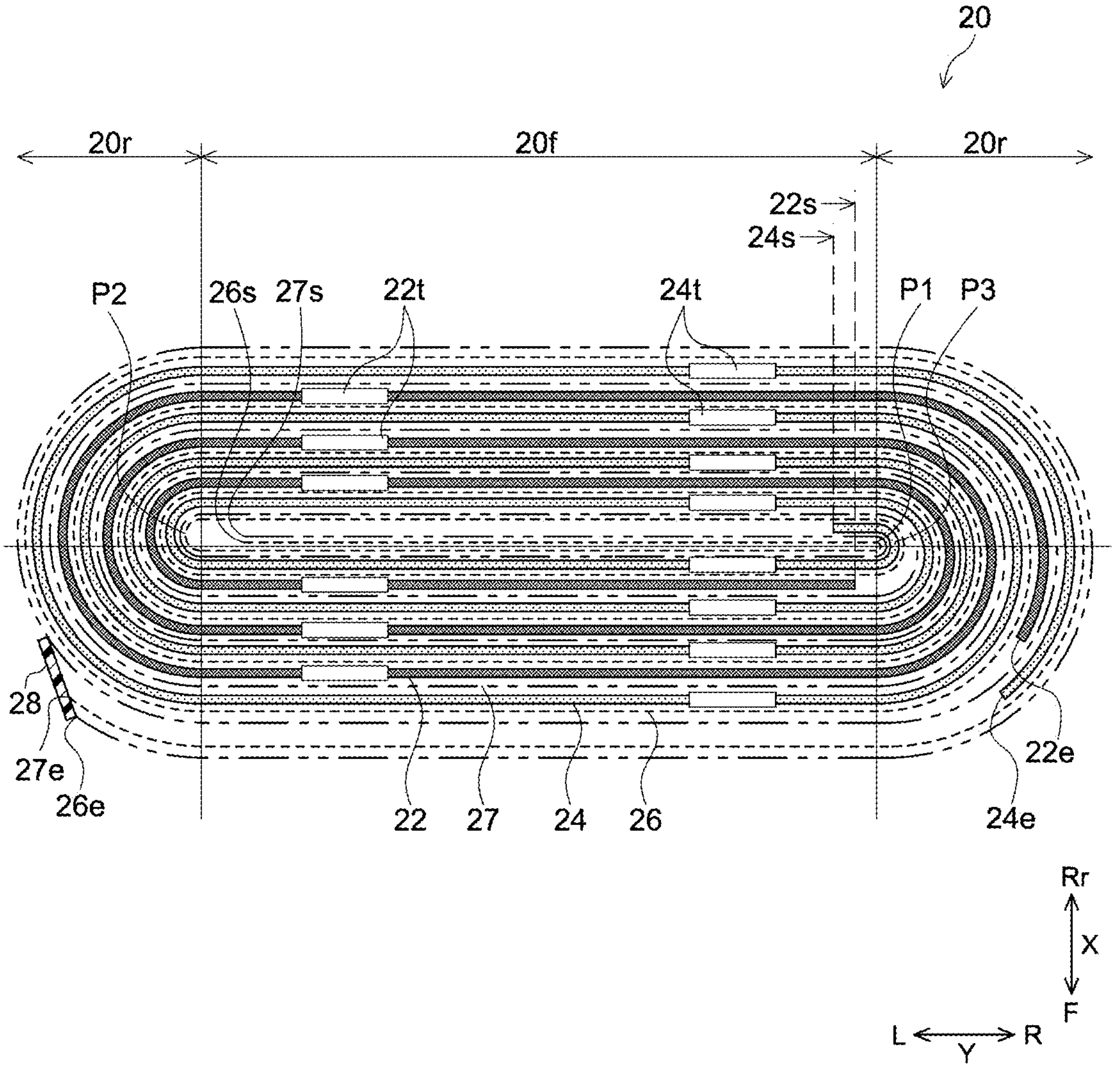
FIG. 6 is a cross-sectional view schematically illustrating a cross-sectional structure of the wound electrode body.
Figure 7:
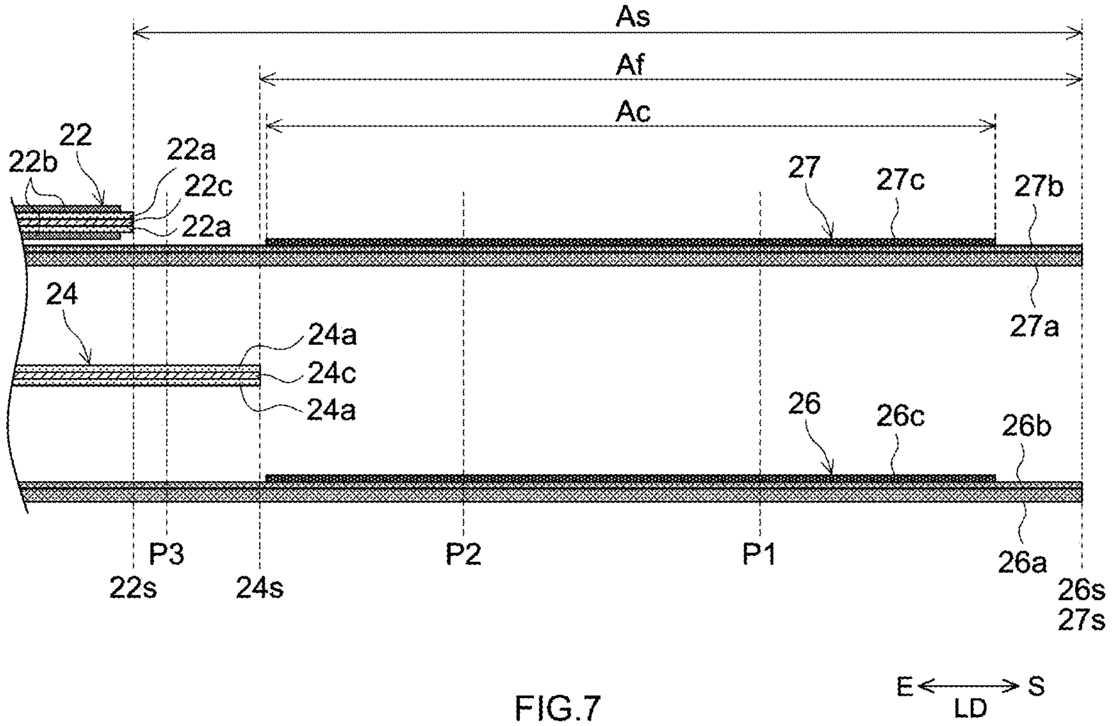
FIG. 7 is an exploded view schematically illustrating a winding start end part of the wound electrode body.

FIG. 5 is a perspective view schematically illustrating a structure of the wound electrode body 20. FIG. 6 is a cross-sectional view schematically illustrating a cross-sectional structure of the wound electrode body 20 in a direction that is orthogonal to a winding axis WL. FIG. 7 is an exploded view schematically illustrating a winding start end part of the wound electrode body 20. A reference sign LD in FIG. 5 and FIG. 7 denotes a longitudinal direction (that is, conveying direction) of the wound electrode body 20 that is manufactured into the band shape. A winding start end side and a winding terminal end side of the longitudinal direction LD are denoted by S and E, respectively. A reference sign WD in FIG. 5 denotes a direction that is orthogonal to the longitudinal direction LD and corresponds to a winding axis direction of the wound electrode body 20. The winding axis direction WD here is substantially parallel to the up-down direction Z of the secondary battery 100.

As illustrated in FIG. 3 and FIG. 6, the external shape of the wound electrode body 20 is a flat shape. The wound electrode body 20 with a flat shape includes a pair of curved parts 20r whose outer surface is curved and a flat part 20f whose outer surface is flat for coupling the pair of curved parts 20r. As illustrated in FIG. 2, the wound electrode body 20 is accommodated inside the battery case 10 so that the winding axis direction WD substantially coincides with the up-down direction Z, in other words, the winding axis direction WD is substantially orthogonal to the sealing plate 14 and the bottom wall 12a. As illustrated in FIG. 3, the pair of curved parts 20r face the pair of short side walls 12c of the exterior body 12, and the flat part 20f faces the long side wall 12b of the exterior body 12.

As illustrated in FIG. 5, the wound electrode body 20 has a structure in which a first separator 26 with a band shape, the negative electrode 24 with a band shape, a second separator 27 with a band shape, and the positive electrode 22 with a band shape are stacked and wound around the winding axis WL. As illustrated in FIG. 2, end surfaces of the wound electrode body 20 (that is, stacked surfaces where the positive electrode 22 and the negative electrode 24 are stacked, opposite end parts in the winding axis direction WD in FIG. 5) face the bottom wall 12a and the sealing plate 14. The positive electrode tab group 22g and the negative electrode tab group 24g to be described below protrude over the wound electrode body 20.

The secondary battery 100 has a so-called upper tab structure in which the positive electrode tab group 22g and the negative electrode tab group 24g are provided at an end part of the wound electrode body 20 on a side of the sealing plate 14 (upper side in FIG. 2). If the secondary battery 100 has the upper tab structure, the middle crack easily occurs when force is applied in the up-down direction Z of the wound electrode body 20, for example. Thus, it is particularly effective to apply the art disclosed herein. However, the secondary battery 100 may have a so-called lateral tab structure in which the positive electrode tab group 22g and the negative electrode tab group 24g are provided at both end parts of the wound electrode body 20 on sides of the pair of short side walls 12*c* (left and right sides in FIG. 2).

As illustrated in FIG. 5, when the length of the wound electrode body 20 in a direction along the winding axis WL (that is, winding axis direction WD) is L1 and the length thereof in a direction perpendicular to the winding axis WL and also perpendicular to the thickness direction of the wound electrode body 20 (that is, in the longitudinal direction LD) is L2 in this embodiment, L2 is twice or more L1. Note that the length L1 is equal to the width of each of the first separator 26 and the second separator 27. According to the present inventor, since the pressure at the pressing is not transmitted easily to the flat part 20*f*, if the length L2 is long, the moldability of the wound electrode body 20 deteriorates and springback or the middle crack occurs easily. Thus, it is effective to apply the art disclosed herein. In particular, when a length Lf of the flat part 20*f* of the wound electrode body 20 in the longitudinal direction LD is 15 cm or more, it is especially effective to apply the art disclosed herein.

As illustrated in FIG. 6, the first separator 26 and the second separator 27 are wound before the negative electrode 24 and the positive electrode 22 in the wound electrode body 20. A winding start end 26*s* of the first separator 26 and a winding start end 27*s* of the second separator 27 exist at the flat part 20*f*. At a center part of the wound electrode body 20 (near the winding axis WL), neither the positive electrode 22 nor the negative electrode 24 is disposed. The center part of the wound electrode body 20 is formed by the first separator 26 and the second separator 27. Therefore, at the center part of the wound electrode body 20, the first separator 26 and the second separator 27 face each other (are in contact with each other) directly. In the description below, the first bending point from the winding start ends 26*s* and 27*s* is referred to as a first bending point P1, the second bending point is referred to as a second bending point P2, and the third bending point is referred to as a third bending point P3.

The first separator 26 and the second separator 27 are folded back at the first bending point P1 and then folded back at the second bending point P2. The negative electrode 24 is wound before the positive electrode 22 here. The winding start end 24*s* of the negative electrode 24 exists at the flat part 20*f*. On the winding start end side relative to the third bending point P3, the winding start end 24*s* of the negative electrode 24 is held between an outer peripheral side of the second separator 27 and an inner peripheral side of the first separator 26 that is folded back at the second bending point P2, and the winding start end 24*s* is wound together with the first separator 26 and the second separator 27. The winding start end 22*s* of the positive electrode 22 exists at the flat part 20*f*. On the winding terminal end side relative to the third bending point P3 (at a position beyond the third bending point P3), the winding start end 22*s* of the positive electrode 22 is held between an inner peripheral side of the second separator 27 and an outer peripheral side of the first separator 26 folded back at the third bending point P3, and the winding start end 22*s* is wound on the outer peripheral side of the first separator 26. On the outer peripheral side of the positive electrode 22, the second separator 27 is wound. On the outer peripheral side of the second separator 27, the negative electrode 24 is wound.

A winding terminal end 22*e* of the positive electrode 22 is positioned at the curved part 20*r*. In this case, the winding terminal end 22*e* of the positive electrode 22 is disposed on the winding start end side relative to a winding terminal end 24*e* of the negative electrode 24. The winding terminal end 24*e* of the negative electrode 24 is positioned at the curved part 20*r*. In this case, the winding terminal end 24*e* of the negative electrode 24 is disposed on the winding terminal end side relative to the winding terminal end 22*e* of the positive electrode 22. The winding terminal end 24*e* of the negative electrode 24 is covered from the outer peripheral side by the pair of separators formed by the first separator 26 and the second separator 27. A winding terminal end 26*e* of the first separator 26 and a winding terminal end 27*e* of the second separator 27 are positioned at the curved part 20*r*. A winding terminal end part (outermost peripheral part) of the second separator 27 forms an outer peripheral surface of the wound electrode body 20. A winding stop tape 28 is attached to the winding terminal end 26*e* of the first separator 26 and the winding terminal end 27*e* of the second separator 27.

The positive electrode 22 is a band-shaped member as illustrated in FIG. 5. The positive electrode 22 includes a positive electrode current collector 22*c* with a band shape, a positive electrode active material layer 22*a* that is fixed on at least one surface of the positive electrode current collector 22*c*, and first adhesive layers 22*b* that are provided on both surfaces of the positive electrode 22. For each member of the positive electrode 22, the conventionally known materials that can be used for general secondary batteries (for example, lithium ion secondary batteries) can be used without particular limitations. For example, the positive electrode current collector 22*c* is preferably formed of a metal foil, and particularly preferably an aluminum foil or an aluminum alloy foil.

The positive electrode active material layer 22*a* is formed to have a band shape along the longitudinal direction LD of the positive electrode current collector 22*c* as illustrated in FIG. 5. As illustrated in FIG. 7, in this case, the positive electrode active material layer 22*a* is formed on each of both surfaces of the positive electrode current collector 22*c* (first surface and second surface, upper surface and lower surface in FIG. 7). The positive electrode active material layer 22*a* includes a positive electrode active material that is capable of reversibly storing and releasing charge carriers. The positive electrode active material is preferably a lithium-transition metal complex oxide, and more preferably contains Ni. Examples of the lithium-transition metal complex oxide containing Ni include a lithium-nickel-cobalt-manganese complex oxide. Furthermore, the positive electrode active material layer 22*a* may contain an optional component other than the positive electrode active material, such as a conductive material, a positive electrode binder, or various additive components. For example, the conductive material is preferably a carbon material such as acetylene black (AB). For example, the positive electrode binder is preferably polyvinylidene fluoride (PVdF).

The positive electrode active material layer 22*a* has a porosity of generally 10 to 40%, and for example 20 to 30%. The porosity of the positive electrode active material layer 22*a* is typically lower than that of the first separator 26 and the second separator 27 (specifically, lower than the porosity of a base material layer 26*a* or a heat resistance layer 26*b* to be described below). Note that the term "porosity" herein refers to the value obtained by dividing the total pore volume ($cm^3$) based on the measurement with a mercury porosimeter by the apparent volume ($cm^3$) of the active material layer and then multiplying the quotient by 100.

The first adhesive layer 22*b* is provided in a band shape along the longitudinal direction LD of the positive electrode current collector 22*c* as illustrated in FIG. 5. As illustrated in FIG. 7, the first adhesive layer 22*b* is uniformly provided from the winding start end 22*s* to the winding terminal end 22*e* of the positive electrode 22. Since it is difficult to form the first adhesive layer 22*b* at an end part of the positive electrode active material layer 22*a*, the first adhesive layer 22*b* here is provided to be smaller in area than the positive electrode active material layer 22*a* in a plan view. The positive electrode active material layer 22*a* is exposed to a part of the surface of the positive electrode 22. In another embodiment, however, the first adhesive layer 22*b* may be provided so as to cover the entire positive electrode active material layer 22*a* (the first adhesive layer 22*b* may be substantially the same as the positive electrode active material layer 22*a* in size).

The first adhesive layer 22*b* is provided in contact with each of the first separator 26 and the second separator 27. That is to say, the first adhesive layer 22*b* is provided to each of both surfaces of the positive electrode 22 (first surface and second surface, upper surface and lower surface in FIG. 7) as illustrated in FIG. 7. Specifically, the first adhesive layer 22*b* is provided on each of the positive electrode active material layers 22*a* provided to the first surface and the second surface of the positive electrode current collector 22*c*. The first adhesive layer 22*b* is formed on each of the surface facing the first separator 26 and the surface facing the second separator 27. On each of the first surface and the second surface, the first adhesive layer 22*b* constitutes the outermost surface of the positive electrode 22. The first adhesive layers 22*b* provided on the first surface and the second surface are attached to the first separator 26 and the second separator 27, respectively, by press-molding at normal temperature or thermal press-molding, for example. Thus, the local increase in interelectrode distance at the flat part 20*f* can be suppressed and the occurrence of the middle crack can be suppressed effectively.

The first adhesive layer 22*b* is a layer including a first adhesive layer binder (adhesive). The structure of the first adhesive layer 22*b* is not limited in particular, and may be similar to the conventionally known one. As the first adhesive layer binder, the conventionally known resin material with a certain degree of viscosity for the first separator 26 and the second separator 27 can be used without particular limitations. Specific examples include resins such as an acrylic resin, a fluorine resin, an epoxy resin, a urethane resin, and an ethylene vinyl acetate resin. In particular, the acrylic resin and the fluorine resin are preferable because of having high flexibility and being able to achieve the adhesiveness to the first separator 26 and the second separator 27 suitably. Examples of the fluorine resin include polyvinylidene fluoride (PVdF), polytetrafluoroethylene (PTFE), and the like. The first adhesive layer 22*b* may include, in addition to the first adhesive layer binder, another material (for example, inorganic filler such as alumina). Since the first adhesive layer 22*b* includes the first adhesive layer binder having higher affinity for the electrolyte solution, the first adhesive layer 22*b* may be a layer swelling by absorbing the electrolyte solution.

Note that the first adhesive layer 22*b* can be manufactured in a manner that, for example, an adhesive layer formation slurry formed by mixing or dispersing the material as described above (first adhesive layer binder or the like) in a suitable solvent is applied and dried on a surface of the positive electrode active material layer 22*a*.

As illustrated in FIG. 5, in the wound electrode body 20, the plurality of positive electrode tabs 22*t* protrude from the root connecting with one end side in the winding axis direction WD to the outside (left side in FIG. 5). The positive electrode tabs 22*t* are provided with a predetermined space (intermittently) along the longitudinal direction LD. The number of positive electrode tabs 22*t* attached to one wound electrode body 20 (in detail, positive electrode 22) may be about several tens or more, for example, 40 to 60. The plurality of positive electrode tabs 22*t* may be different from each other in size or shape. The positive electrode tabs 22*t* constitute a part of the positive electrode 22 here. The positive electrode tab 22*t* here is a region where the positive electrode active material layer 22*a* is not formed and the positive electrode current collector 22*c* is exposed. However, the positive electrode tabs 22*t* and the positive electrode 22 may be different members. When the plurality of positive electrode tabs 22*t* are provided, the unevenness of resistance or potential in the positive electrode 22 can be reduced.

The positive electrode tabs 22*t* are stacked at one end part of the wound electrode body 20 in the winding axis direction WD and form the positive electrode tab group 22*g* (see FIG. 2 and FIG. 4). As illustrated in FIG. 4, the plurality of positive electrode tabs 22*t* are bent and curved. Tip end parts of the plurality of positive electrode tabs 22*t* are joined to the positive electrode current collecting member 50. The plurality of positive electrode tabs 22*t* (the positive electrode tab group 22*g*) are electrically connected to the positive electrode terminal 30 through the positive electrode current collecting member 50. The plurality of positive electrode tabs 22*t* are preferably joined to the positive electrode current collecting member 50 while being bent and curved.

The negative electrode 24 is a band-shaped member as illustrated in FIG. 5. The negative electrode 24 includes a negative electrode current collector 24*c* with a band shape, and a negative electrode active material layer 24*a* that is fixed on at least one surface of the negative electrode current collector 24*c*. In this case, the negative electrode 24 does not include an adhesive layer. However, the negative electrode 24 may include adhesive layers on surfaces thereof, and the adhesive layers may be attached to the first separator 26 and the second separator 27, respectively. For each member of the negative electrode 24, the conventionally known materials that can be used for general secondary batteries (for example, lithium ion secondary batteries) can be used without particular limitations. For example, the negative electrode current collector 24*c* is preferably formed of a metal foil, and particularly preferably a copper foil or a copper alloy foil.

The negative electrode active material layer 24*a* is formed to have a band shape along the longitudinal direction LD of the negative electrode current collector 24*c* as illustrated in FIG. 5. As illustrated in FIG. 7, in this case, the negative electrode active material layer 24*a* is formed on each of both surfaces of the negative electrode current collector 24*c* (first surface and second surface, upper surface and lower surface in FIG. 7). The negative electrode active material layer 24*a* includes a negative electrode active material that is capable of reversibly storing and releasing the charge carriers. The negative electrode active material is preferably, for example, a carbon material such as graphite or a Si-containing material. The negative electrode active material layer 24*a* may contain an optional component other than the negative electrode active material, such as a negative electrode binder, a conductive material, or various additive components. For example, the negative electrode binder preferably contains rubbers such as styrene butadiene rubber (SBR) or celluloses such as carboxymethyl cellulose (CMC). The conductive material is preferably a carbon material.

As illustrated in FIG. 5, in the wound electrode body 20, the plurality of negative electrode tabs 24*t* protrude from the root connecting with one end side in the winding axis direction WD to the outside (left side in FIG. 5). The negative electrode tabs 24*t* are provided with a predetermined space (intermittently) along the longitudinal direction LD. The negative electrode tabs 24*t* are provided at the end part on the same side (left side in FIG. 5) as the positive electrode tabs 22*t* in the winding axis direction WD. The number of negative electrode tabs 24*t* attached to one wound electrode body 20 (in detail, negative electrode 24) is substantially the same as the number of positive electrode tabs 22*t* and may be about several tens or more, for example, 40 to 60. The plurality of negative electrode tabs 24*t* may be different from each other in size or shape. The negative electrode tabs 24*t* constitute a part of the negative electrode 24 here. The negative electrode tab 24*t* here is a region where the negative electrode active material layer 24*a* is not formed and the negative electrode current collector 24*c* is exposed. However, the negative electrode tab 24*t* and the negative electrode 24 may be different members. When the plurality of negative electrode tabs 24*t* are provided, the unevenness of resistance or potential in the negative electrode 24 can be reduced.

The negative electrode tabs 24*t* are stacked at one end part of the wound electrode body 20 in the winding axis direction WD and form the negative electrode tab group 24*g* (see FIG. 2). Although the illustration is omitted, the plurality of negative electrode tabs 24*t* are bent and curved in a manner similar to the plurality of positive electrode tabs 22*t* as described above. Tip end parts of the plurality of negative electrode tabs 24*t* are joined to the negative electrode current collecting member 60. The plurality of negative electrode tabs 24*t* (the negative electrode tab group 24*g*) are electrically connected to the negative electrode terminal 40 through the negative electrode current collecting member 60. The plurality of negative electrode tabs 24*t* are preferably joined to the negative electrode current collecting member 60 while being bent and curved.

Each of the first separator 26 and the second separator 27 is a band-shaped member as illustrated in FIG. 5. The first separator 26 and the second separator 27 are members that insulate the positive electrode active material layer 22*a* of the positive electrode 22 and the negative electrode active material layer 24*a* of the negative electrode 24 from each other. In this embodiment, as illustrated in FIG. 7, the first separator 26 and the second separator 27 include base material layers 26*a* and 27*a* formed of resin, heat resistance layers (HRLs) 26*b* and 27*b* provided on one surface of the base material layers 26*a* and 27*a*, and second adhesive layers 26*c* and 27*c* provided on surfaces of the heat resistance layers 26*b* and 27*b*, respectively. The first separator 26 and the second separator 27 preferably include the base material layers 26*a* and 27*a* and the heat resistance layers 26*b* and 27*b*, respectively.

The first separator 26 and the second separator 27 have the same structure here. In another embodiment, however, the first separator 26 and the second separator 27 may have different structures. For example, the first separator 26 or the second separator 27 does not have to include the second adhesive layer 26*c* or 27*c*. That is to say, in the art disclosed herein, at least one of the first separator 26 and the second separator 27 may include the second adhesive layer 26*c* or 27*c*. The heat resistance layers 26*b* and 27*b* and the second adhesive layers 26*c* and 27*c* are provided on only the surfaces of the base material layers 26*a* and 27*a* on one side here. In another embodiment, however, the second adhesive layers 26*c* and 27*c* may be provided on the surfaces on both sides in the first separator 26 and/or the second separator 27. Thus, the formation of the large space at the center part of the wound electrode body 20 can be suppressed at a high level.

As the base material layers 26*a* and 27*a*, a porous sheet that can be used for the separators of the conventionally known secondary batteries can be used without particular limitations. In particular, from the viewpoint of securing the flexibility sufficiently, a porous sheet made of polyolefin, that is, polyolefin resin is suitable. As the polyolefin resin, polyethylene (PE), polypropylene (PP), or a mixture thereof is preferable and PE is more preferable. Each of the base material layers 26*a* and 27*a* may have a single-layer structure or a multilayer structure of two or more layers (for example, three-layer structure of PP/PE/PP or the like). The porosity of the base material layers 26*a* and 27*a* is typically higher than that of the positive electrode active material layer 22*a*, and is generally 20% or more and may be 30 to 50%, for example.

As illustrated in FIG. 7, the heat resistance layers 26*b* and 27*b* are provided on the surfaces of the base material layers 26*a* and 27*a*. The heat resistance layers 26*b* and 27*b* are provided in a band shape along the longitudinal direction LD of the base material layers 26*a* and 27*a*. When the first separator 26 and the second separator 27 include the heat resistance layers 26*b* and 27*b* respectively, the thermal contraction of the first separator 26 and the second separator 27 can be suppressed and the safety of the secondary battery 100 can be improved. The heat resistance layers 26*b* and 27*b* are preferably provided on at least surfaces facing the positive electrode 22. At least one of (preferably both) the first separator 26 and the second separator 27 preferably includes the heat resistance layer 26*b* or 27*b* on the surface facing the positive electrode 22. According to the present inventor's examination, if the heat resistance layers 26*b* and 27*b* are provided on the surfaces facing the positive electrode 22, the adhesiveness to the positive electrode 22 decreases in particular, in which case the moldability of the wound electrode body 20 tends to deteriorate. Thus, it is particularly effective to apply the art disclosed herein. However, the heat resistance layers 26*b* and 27*b* are not always necessary and can be omitted in another embodiment.

The heat resistance layers 26*b* and 27*b* are layers including the inorganic filler. As the inorganic filler, the conventionally known ones that have been used in this kind of application can be used without particular limitations. The inorganic filler preferably includes insulating ceramic particles such as alumina, boehmite, aluminum hydroxide, or titania. The heat resistance layers 26*b* and 27*b* may further include a heat resistance layer binder. The heat resistance layers 26*b* and 27*b* preferably include the inorganic filler and the heat resistance layer binder. As the heat resistance layer binder, the conventionally known ones that have been used in this kind of application can be used without particular limitations. The porosity of the heat resistance layers 26*b* and 27*b* is typically higher than that of the positive electrode active material layer 22*a* and moreover, higher than that of the base material layers 26*a* and 27*a*, and is generally 50% or more and may be 50 to 80% or 60 to 70%, for example.

As illustrated in FIG. 7, the second adhesive layers 26*c* and 27*c* are provided on the surfaces of the heat resistance layers 26*b* and 27*b*, respectively. The second adhesive layers 26*c* and 27*c* are provided at least in a region that exists on the winding start end side relative to the winding start end 22*s* of the positive electrode 22 (winding start end region As). As described above, since the pressure at the pressing is not transmitted easily to the flat part 20*f*, the second adhesive layers 26*c* and 27*c* are preferably provided at least in the flat part 20*f* of the winding start end region As. The winding start end region As includes a region where the second adhesive layer 26*c* of the first separator 26 is in contact with the facing second separator 27 and the second adhesive layer 27*c* of the second separator 27 is in contact with the first separator 26.

The second adhesive layers 26*c* and 27*c* are provided only in the winding start end region As here. In other words, the second adhesive layers 26*c* and 27*c* are not provided in other than the winding start end region As here. Since the second adhesive layers 26*c* and 27*c* have high resistance, suppressing (reducing) the second adhesive layers 26*c* and 27*c* to the minimum can suppress the increase in battery resistance. However, the region where the second adhesive layers 26*c* and 27*c* are formed can be changed optionally in accordance with the design of the wound electrode body 20, for example; thus, in another embodiment, the second adhesive layers 26*c* and 27*c* may be provided in the entire surface of the first separator 26 and/or the second separator 27, for example. In this case, it is preferable that the mass of the second adhesive layers 26*c* and 27*c* per unit area in other than the winding start end region As be smaller than that in the winding start end region As.

The second adhesive layers 26*c* and 27*c* are provided here in a directly facing region Af where the first separator 26 and the second separator 27 face each other directly (in other words, a region where only the first separator 26 and the second separator 27 are wound). More specifically, the second adhesive layers 26*c* and 27*c* are provided in a region Ac ranging from a position at a predetermined distance from the winding start ends 26*s* and 27*s* to just before the winding start end 24*s* of the negative electrode 24 passing the first bending point P1 and the second bending point P2. In the region Ac, the first separator 26 and the second separator 27 are attached to each other by the second adhesive layers 26*c* and 27*c*. The second adhesive layer 26*c* is attached to the facing second separator 27 by press-molding at normal temperature or thermal press-molding, for example. The second adhesive layer 27*c* is attached to the first separator 26 by press-molding at normal temperature or thermal press-molding, for example. Thus, at the center part of the wound electrode body 20 where the pressure at the pressing is not applied easily, the formation of the large space can be suppressed and the occurrence of the middle crack can be suppressed effectively.

In the winding start end region As, when the entire area of the directly facing region Af is 100%, the area of the region Ac (the region where the first separator 26 and the second separator 27 are attached to each other by the second adhesive layers 26*c* and 27*c*) is preferably 30% or more. Thus, the formation of the large space at the center part of the wound electrode body 20 and the increase in thickness of the wound electrode body 20 can be suppressed more effectively while the second adhesive layers 26*c* and 27*c* (typically, the amount of second adhesive layer binder) are reduced. The ratio of the area of the region Ac in the directly facing region Af is more preferably 50% or more and still more preferably 70% or more. The ratio of the area of the region Ac in the directly facing region Af may be 95% or less, or 90% or less.

The second adhesive layers 26*c* and 27*c* are layers including the second adhesive layer binder (adhesive). The structure of the second adhesive layers 26*c* and 27*c* is not limited in particular, and may be similar to the conventionally known one. As the second adhesive layer binder, the conventionally known resin material with a certain degree of viscosity for the first separator 26 and the second separator 27 can be used without particular limitations. Specific examples include resins such as an acrylic resin, a fluorine resin, an epoxy resin, a urethane resin, and an ethylene vinyl acetate resin. In particular, the acrylic resin and the fluorine resin are preferable because of having high flexibility and being able to achieve the adhesiveness to the first separator 26 and the second separator 27 suitably. Examples of the fluorine resin include polyvinylidene fluoride (PVdF), polytetrafluoroethylene (PTFE), and the like. The second adhesive layers 26*c* and 27*c* may include, in addition to the second adhesive layer binder, another material (for example, inorganic filler such as alumina). The second adhesive layers 26*c* and 27*c* have relatively higher affinity for the electrolyte solution compared with the heat resistance layers 26*b* and 27*b*, for example, and may be layers swelling by absorbing the electrolyte solution.

Note that the second adhesive layers 26*c* and 27*c* can be manufactured in a manner that, for example, an adhesive layer formation slurry formed by mixing or dispersing the material as described above (second adhesive layer binder or the like) in a suitable solvent is applied and dried on the surfaces of the heat resistance layers 26*b* and 27*b* (or base material layers 26*a* and 27*a*).

The second adhesive layers 26*c* and 27*c* may be formed of a material different from that of the first adhesive layer 22*b*. The second adhesive layers 26*c* and 27*c* may include the adhesive layer binder different from that of the first adhesive layer 22*b*. For example, one of the first adhesive layer 22*b* and the second adhesive layers 26*c* and 27*c* may include the acrylic resin while the other may include the fluorine resin. Thus, the adhesiveness can be improved. Alternatively, the second adhesive layers 26*c* and 27*c* may be formed of the same material as the first adhesive layer 22*b*. The second adhesive layers 26*c* and 27*c* may include the same adhesive layer binder as the first adhesive layer 22*b*. In one example, both the first adhesive layer 22*b* and the second adhesive layers 26*c* and 27*c* may include the acrylic resin. In another example, both the first adhesive layer 22*b* and the second adhesive layers 26*c* and 27*c* may include the fluorine resin. Thus, the second adhesive layers 26*c* and 27*c* can be formed without the necessity of preparing the slurry.

The mass of the second adhesive layers 26*c* and 27*c* per unit area is preferably larger than the mass of the first adhesive layer 22*b* per unit area. That is to say, the heat resistance layers 26*b* and 27*b* (or the base material layers 26*a* and 27*a*) on which the second adhesive layers 26*c* and 27*c* are provided have higher porosity than the positive electrode active material layer 22*a*. Therefore, when the second adhesive layers 26*c* and 27*c* are formed on the surfaces of the heat resistance layers 26*b* and 27*b* (or base material layers 26*a* and 27*a*), the constituent material of the second adhesive layers 26*c* and 27*c* (mainly the second adhesive layer binder) easily permeates into the heat resistance layers 26*b* and 27*b* (or base material layers 26*a* and 27*a*). The second adhesive layer binder having permeated into the heat resistance layers 26*b* and 27*b* (or base material layers 26*a* and 27*a*) does not contribute to the adhesive strength. Therefore, the mass of the second adhesive layers 26*c* and 27*c* per unit area (typically, the mass of adhesive layer binder) is preferably relatively large compared with the case of forming the first adhesive layer 22*b* on the surface of the positive electrode active material layer 22*a*. In other words, the mass of the first adhesive layer 22*b* per unit area is preferably smaller than the mass of the second adhesive layers 26*c* and 27*c* per unit area. Thus, in the region where the positive electrode 22 and the negative electrode 24 face each other, the amount of adhesive layer binder with high resistance can be reduced and the increase in battery resistance can also be suppressed.

The region where the first separator 26 and the second separator 27 face each other directly (for example, directly facing region Af) preferably includes a region where the second adhesive layers 26*c* and 27*c* do not exist between the first separator 26 and the second separator 27. In this embodiment, as illustrated in FIG. 6, the second adhesive layers 26*c* and 27*c* do not exist between the first separator 26 and the second separator 27 in a winding terminal end region existing on the winding terminal end side relative to the winding terminal end 24*e* of the negative electrode 24. As illustrated in FIG. 7, the second adhesive layers 26*c* and 27*c* are not provided near the winding start ends 26*s* and 27*s* in the directly facing region Af in the winding start end region As. Accordingly, the second adhesive layers 26*c* and 27*c* (typically, the amount of second adhesive layer binder) can be reduced and the increase in battery resistance can be suppressed. In addition, it is possible to prevent the electrolyte solution from being deprived because of absorption in the second adhesive layers 26*c* and 27*c* in a part that does not contribute to the battery reaction. Thus, the amount of electrolyte solution can be cut and the cost for manufacturing the battery can be reduced.

As described above, the second adhesive layers 26*c* and 27*c* are provided in the winding start end region As and the first separator 26 and the second separator 27 are attached to each other; thus, the formation of the large space at the center part of the wound electrode body 20 can be suppressed. Furthermore, the first adhesive layer 22*b* is provided on each of both surfaces of the positive electrode 22 and the positive electrode 22 is attached to each of the first separator 26 and the second separator 27; thus, the local increase in distance between the positive electrode 22 and the negative electrode 24 at the flat part 20*f* can be suppressed. Therefore, according to the art disclosed herein, the occurrence of the middle crack can be suppressed while the amount of adhesive layer binder is reduced. Preferably, the wound electrode body 20 without the middle crack can be achieved. As a result, the increase in thickness of the wound electrode body 20 after the press-molding can be suppressed, and moreover, the decrease in insertability into the battery case 10, the increase in resistance, the precipitation of the charge carriers (for example, Li), and the like can be suppressed. Moreover, by providing the first adhesive layer 22*b* in the positive electrode 22, the amount of using the adhesive layer binder can be reduced relatively and the increase in battery resistance can be suppressed compared with the case of providing the adhesive layer on the entire first separator 26 and/or second separator 27.

On the other hand, according to the present inventor's examination, in the structure in which the adhesive layer is not provided to the separator and the adhesive layer is provided to the entire positive electrode, the border between the separators is not attached at the center part of the wound electrode body as described above; thus, the large space is formed at the center part of the wound electrode body relatively compared to the art disclosed herein. On the contrary, in the structure in which the adhesive layer is not provided to the positive electrode and the adhesive layer is provided to the entire separator, the adhesive layer binder permeates into the separator as described above; thus, in order to achieve the desired adhesive strength, the amount of using the adhesive layer binder increases relatively compared with the case of providing the adhesive layer to the positive electrode. As a result, compared with the art disclosed herein, the battery resistance increases relatively and the battery characteristic (for example, output characteristic) decreases. These demonstrate the significance of the art disclosed herein.

The secondary battery 100 can be used for various purposes, but can be suitably used in an application in which the high capacity is needed, for example, as a power source (driving power source) for a motor mounted on a moving body (typically, a vehicle such as a passenger car or a truck). The vehicle is not limited to a particular type, and may be, for example, a plug-in hybrid electric vehicle (PHEV), a hybrid electric vehicle (HEV), or a battery electric vehicle (BEV).

Although some embodiments of the present disclosure have been described above, these embodiments are just examples. The present disclosure can be implemented in various other modes. The present disclosure can be implemented based on the contents disclosed in this specification and the technical common sense in the relevant field. The techniques described in the scope of claims include those in which the embodiments exemplified above are variously modified and changed. For example, a part of the aforementioned embodiment can be replaced by another modified aspect, and the other modified aspect can be added to the aforementioned embodiment. Additionally, the technical feature may be deleted as appropriate unless such a feature is described as an essential element.

As described above, the following items are given as specific aspects of the art disclosed herein.

Item 1: The secondary battery including: the wound electrode body with a flat shape in which the first separator with a band shape, the negative electrode with a band shape, the second separator with a band shape, and the positive electrode with a band shape are stacked and wound around the winding axis; and the battery case that accommodates the wound electrode body, in which the positive electrode includes the first adhesive layers on the first surface and the second surface, by the first adhesive layers, the first surface and the first separator are attached to each other and the second surface and the second separator are attached to each other, at least one of the first separator and the second separator includes the second adhesive layer in the winding start end region that exists on the winding start end side relative to the winding start end of the positive electrode, and the first separator and the second separator are attached to each other by the second adhesive layer.

Item 2: The secondary battery according to Item 1, in which when the length of the wound electrode body in the direction along the winding axis is L1 and the length thereof in the direction perpendicular to the winding axis and perpendicular to the thickness direction of the wound electrode body is L2, L2 is twice or more L1.

Item 3: The secondary battery according to Item 1 or 2, further including: the positive electrode tab group including the plurality of positive electrode tabs provided at the end part of the wound electrode body on one side in the winding axis direction and electrically connected to the positive electrode; and the negative electrode tab group including the plurality of negative electrode tabs provided at the end part of the wound electrode body on the one side in the winding axis direction and electrically connected to the negative electrode, in which the battery case includes the exterior body including the opening, the bottom wall facing the opening, the pair of first side walls extending from the bottom wall and facing each other, and the second side walls extending from the bottom wall and facing each other, and the sealing plate that seals the opening, and the positive electrode tab group and the negative electrode tab group are provided at the end part of the wound electrode body on the side of the sealing plate.

Item 4: The secondary battery according to any one of Items 1 to 3, in which at least one of the first separator and the second separator includes the base material layer made of polyolefin, and the heat resistance layer formed on the surface of the base material layer that faces the positive electrode and including the inorganic filler and the heat resistance layer binder.

Item 5: The secondary battery according to any one of Items 1 to 4, in which when the entire area of the directly facing region where the first separator and the second separator face each other directly is 100% in the winding start end region, the area of the region where the first separator and the second separator are attached to each other by the second adhesive layer is 30% or more.

Item 6: The secondary battery according to any one of Items 1 to 5, in which the region where the first separator and the second separator face each other directly includes the region where the second adhesive layer does not exist between the first separator and the second separator.

Item 7: The secondary battery according to any one of Items 1 to 6, in which the first adhesive layer and the second adhesive layer are formed of the different materials.

Item 8: The secondary battery according to any one of Items 1 to 7, in which the first adhesive layer and the second adhesive layer are formed of the same material.

Item 9: The secondary battery according to any one of Items 1 to 8, in which the mass of the second adhesive layer per unit area is larger than the mass of the first adhesive layer per unit area.

Although the preferred embodiment of the present application has been described thus far, the foregoing embodiment is only illustrative, and the present application may be embodied in various other forms. The present application may be practiced based on the disclosure of this specification and technical common knowledge in the related field. The techniques described in the claims include various changes and modifications made to the embodiment illustrated above. Any or some of the technical features of the foregoing embodiment, for example, may be replaced with any or some of the technical features of variations of the foregoing embodiment. Any or some of the technical features of the variations may be added to the technical features of the foregoing embodiment. Unless described as being essential, the technical feature(s) may be optional.

REFERENCE SIGNS LIST

10 Battery case
12 Exterior body
14 Sealing plate
20 Wound electrode body
**20*f*** Flat part
**20*r*** Curved part
22 Positive electrode
**22*e*** Winding terminal end
**22*s*** Winding start end
**22*t*** Positive electrode tab
24 Negative electrode
**24*e*** Winding terminal end
**24*s*** Winding start end
**24*t*** Negative electrode tab
26 First separator
**26*a*** Base material layer
**26*b*** Heat resistance layer
**26*c*** Second adhesive layer
27 Second separator
**27*a*** Base material layer
**27*b*** Heat resistance layer
**27*c*** Second adhesive layer
100 Secondary battery

What is claimed is:

1. A secondary battery, comprising:
a wound electrode body with a flat shape in which a first separator with a band shape, a negative electrode with a band shape, a second separator with a band shape, and a positive electrode with a band shape are stacked and wound around a winding axis; and
a battery case that accommodates the wound electrode body, wherein
the positive electrode includes first adhesive layers on a first surface and a second surface,
by the first adhesive layers, the first surface and the first separator are attached to each other and the second surface and the second separator are attached to each other,
at least one of the first separator and the second separator includes a second adhesive layer in a winding start end region that exists on a winding start end side relative to a winding start end of the positive electrode, and
the first separator and the second separator are attached to each other by the second adhesive layer, wherein
each of the first separator and the second separator includes a no-adhesive area in which no adhesive layer is provided, the no-adhesive area being disposed between a position facing the winding start end of the positive electrode and a region to which the second adhesive layer is applied in a longitudinal direction of the wound electrode body.

2. The secondary battery according to claim 1, wherein when a length of the wound electrode body in a direction along the winding axis is L1 and a length thereof in a direction perpendicular to the winding axis and perpendicular to a thickness direction of the wound electrode body is L2, L2 is twice or more L1.

3. The secondary battery according to claim 1, further comprising:
a positive electrode tab group including a plurality of positive electrode tabs provided at an end part of the wound electrode body on one side in a winding axis direction and electrically connected to the positive electrode; and
a negative electrode tab group including a plurality of negative electrode tabs provided at an end part of the wound electrode body on the one side in the winding axis direction and electrically connected to the negative electrode, wherein
the battery case includes an exterior body including an opening, a bottom wall facing the opening, a pair of first side walls extending from the bottom wall and facing each other, and second side walls extending from the bottom wall and facing each other, and a sealing plate that seals the opening, and
the positive electrode tab group and the negative electrode tab group are provided at an end part of the wound electrode body on a side of the sealing plate.

4. The secondary battery according to claim 1, wherein at least one of the first separator or the second separator includes a base material layer made of polyolefin, and a heat resistance layer formed on a surface of the base material layer that faces the positive electrode and including inorganic filler and a heat resistance layer binder.

5. The secondary battery according to claim 1, wherein when an entire area of a directly facing region where the first separator and the second separator face each other directly is 100% in the winding start end region, an area of a region where the first separator and the second separator are attached to each other by the second adhesive layer is 30% or more.

6. The secondary battery according to claim 1, wherein the first adhesive layer and the second adhesive layer are formed of different materials.

7. The secondary battery according to claim 1, wherein the first adhesive layer and the second adhesive layer are formed of the same material.

8. The secondary battery according to claim 1, wherein a mass of the second adhesive layer per unit area is larger than a mass of the first adhesive layer per unit area.

9. The secondary battery according to claim 1, wherein each of the first separator and the second separator includes a further no-adhesive area in which no adhesive layer is provided, and the further no-adhesive area is disposed between the region to which the second adhesive layer is applied and a winding start end of the first separator or the second separator in the longitudinal direction.

10. The secondary battery according to claim 1, wherein the winding start end region includes:

a directly facing region where the first separator and the second separator face each other directly, a second adhesive region where the first separator and the second separator are attached to each other by the second adhesive layer, and a ratio of an entire area of the second adhesive region to an entire area of the directly facing region is 95% or less.

11. The secondary battery according to claim 1, wherein the positive electrode includes the first surface and the second surface, the second surface being opposite to the first surface, a first positive electrode active material layer on the first surface, and a second positive electrode active material layer on the second surface, and the first adhesive layers are directly disposed on the first and second positive electrode active material layers of the positive electrode.

* * * * *